United States Patent [19]
Bedore

[11] Patent Number: 5,971,843
[45] Date of Patent: Oct. 26, 1999

[54] CHICKEN WING DE-BONING MACHINE

[75] Inventor: Robert L. Bedore, San Diego, Calif.

[73] Assignees: Charles W. Dealy, III; John H. Fankhauser, II, San Diego, Calif.

[21] Appl. No.: 09/075,150

[22] Filed: May 8, 1998

[51] Int. Cl.$^6$ .................................................. A22C 17/04
[52] U.S. Cl. ........................................... 452/136; 452/127
[58] Field of Search .................................. 452/136, 135, 452/127, 125

[56] References Cited

U.S. PATENT DOCUMENTS

| | | | |
|---|---|---|---|
| 2,893,051 | 7/1959 | Massengill | 452/136 |
| 3,470,581 | 10/1969 | Hopkins | 452/136 |
| 4,380,849 | 4/1983 | Adkison et al. | 452/136 |
| 4,488,332 | 12/1984 | Atteck et al. | 452/136 |
| 4,811,456 | 3/1989 | Heuvel | 452/136 |

*Primary Examiner*—Willis Little
*Attorney, Agent, or Firm*—Henri J. A. Charmasson; John D. Buchaca

[57] ABSTRACT

An apparatus for extracting a bone from a cut of meat comprises a frusto-conical blade against which the cut of meat is pushed in the axial direction of, and in line with the bone. The apical opening edge of the blade cuts and spreads the meat around the bone, allowing the bone to pass through the blade while the meat is crunched against the wall of the blade and its backing plate. The bone is grabbed by a pair of jaws terminated by barbed cylinders that rotate in opposite directions to further extract the bone from the cut of meat. The movements of the jaw and of a lever that pushes the cut of meat towards the blade are synchronized by a single camshaft mounting eccentric wheels acting on both the jaws and the pushing lever. These movements are driven for safety by the pull of coil springs. Electrical motors only return the jaws and lever to their rest position.

7 Claims, 2 Drawing Sheets

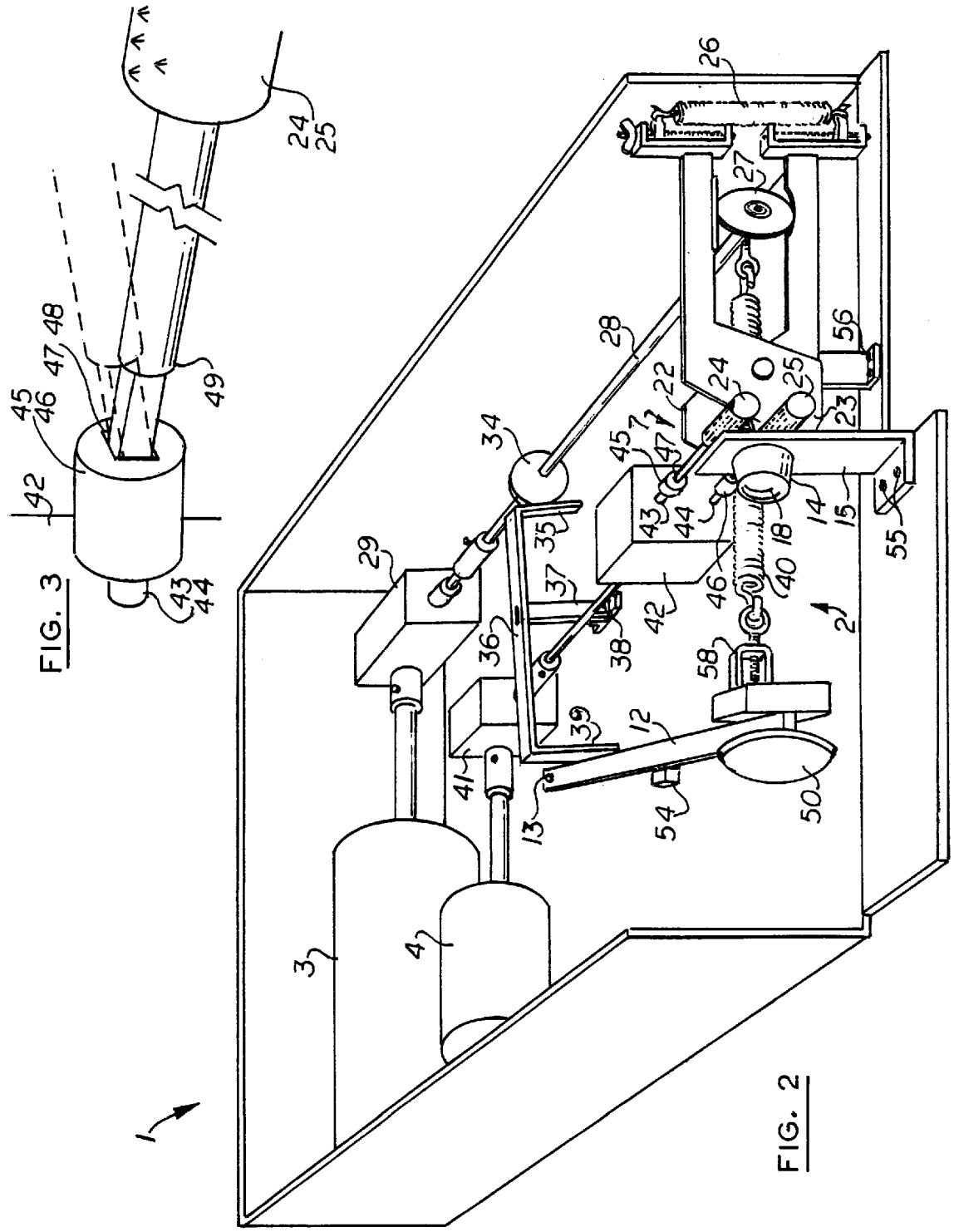

CHICKEN WING DE-BONING MACHINE

FIELD OF THE INVENTION

This invention relates to meat-cutting and processing devices, and particularly to machinery for boning cuts of poultry limbs such as chicken wings.

BACKGROUND OF THE INVENTION

One can find in the prior art, several types of boning machines, a good number of them particularly adapted for extracting bones from chicken limbs without slicing or cutting apart the skin and flesh surrounding the bone so that the bone can be replaced by stuffing or other savory preparations. The most representative example of that prior art can be found in U.S. Pat. No. 4,942,642 Fankhauser, II et al. This aforementioned example of machinery exhibits certain disadvantages common to the prior art such as extreme complexity, high maintenance cost, and cleaning and sterilizing difficulties. There is a great need for a simple piece of de-boning machinery that is safe to operate and can be quickly cleaned and sterilized.

SUMMARY OF THE INVENTION

The principal and secondary objects of this invention are to provide a simple bone-extracting device particularly adapted to remove bones from the cut limbs of poultry in a single cutting and pulling movement, where said apparatus is safe to operate and easily cleaned. These and other valuable objects are achieved by a table or countertop apparatus packaged in a suitcase-sized housing having in its front face a meat cut mounting station. A frusto-conical cutting and de-boning blade against which the cut of meat is automatically pushed as well as a pair of bone-grabbing and extracting jaws are covered by a protective shield. The pushing and bone-extracting mechanisms are driven by coil springs and controlled from a single camshaft for precise coordination of the movements.

BRIEF DESCRIPTION OF THE DRAWING

FIG. 2 is a perspective view of the machine with its protective shield and top cover removed to expose the interior mechanism; and FIG. 3 is a detail perspective view of a cylinder drive shaft coupling.

DESCRIPTION OF THE PREFERRED EMBODIMENT OF THE INVENTION

Figure 1:
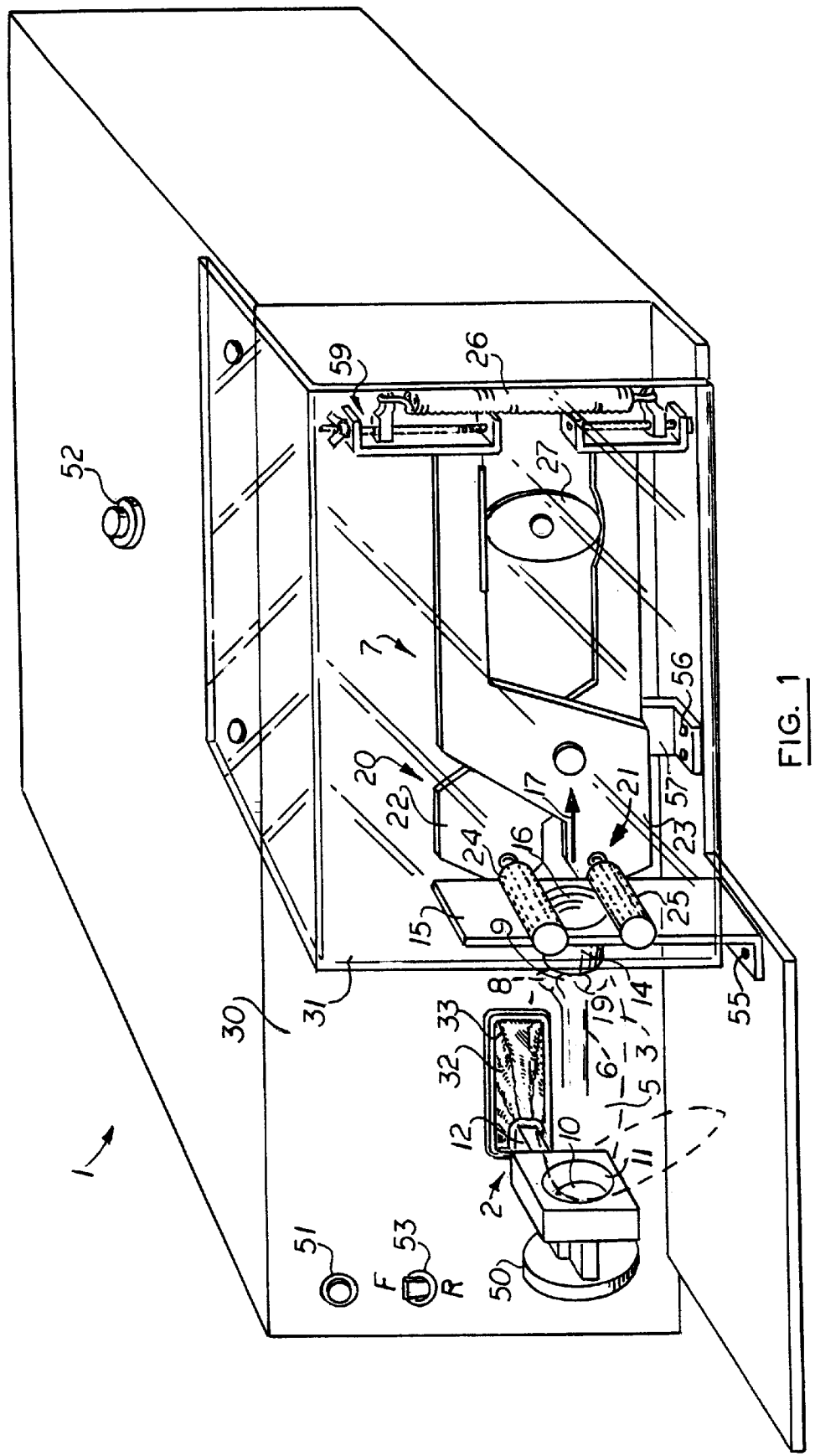
FIG. 1 is a perspective view of a boning machine according to the invention.

Referring now to the drawing, there is shown a simple boning apparatus 1 particularly adapted to extract the bone out of a cut of poultry limb. The apparatus is housed in a relatively small enclosure suitable for use on table or counter tops, and weighing no more than 40 kilograms. Except for the meat cut holding station 2 mounted against the front panel of the apparatus, all the cutting and boning mechanisms are shielded for safety against inadvertent contact by the operator.

As more specifically illustrated in FIG. 2, the apparatus is driven by two electrical motors 3, 4. In the meat cut holding station 2, a meat cut, for instance a chicken wing 5, is positioned and held with its bone or bones 6 axially oriented toward the meat cutting and bone extracting station 7, with the open end of the wing 8 facing that station. This apparatus or a closely similar version of it could be used to process other types of meat cuts having median elongated bones. For sake of simplicity and consistency, the meat cut 5 will, hereinafter, be referred to as having its proximal end 8 surrounding the proximal extremity 9 of the bone 6 closest to the cutting and boning station 7. The distal end 10 of the meat cut rests against a meat cut holding seat 11 on the left side of the meat cut holding station 2. That side is connected to a pushing lever 12 whose role is to translate the meat cut holding station 2 toward the cutting and boning station 7. The pushing lever 12 is anchored inside the enclosure to a pivot point 13. The station 7 comprises a frusto-conical blade 14 having its open base mounted on a support plate 15 around an opening 16 in that plate. The blade is similar in shape and function to the stripping unit disclosed in U.S. Pat. No. 4,942,642 Fankhauser, II et al. which is incorporated in this specification by this reference. The plate 15 lies in a plane perpendicular to the meat cut and meat cut holding station direction of travel 17 so that the apical aperture 18 of the blade and the plate opening 16 are coaxial with the bone 6 to be extracted. The diameter of the apical aperture 18 is preferably slightly larger than the diameter of largest part, usually the condyle 19 of the bone 6. When the apical end of the blade contacts the meat cut, the meat surrounding the proximal extremity of the bone is cut and separated from the bone and slightly spread radially outward. More specifically, the tendons that tie the skin to the condyle are cut. The bone passes through the blade and the plate opening 16 while the meat is compressed against, and retained by the outer wall of the blade and its support plate.

Immediately behind the blade mounting plate 15, on the side opposite the meat cut holding station 2, is a bone-extracting mechanism 20. This mechanism comprises a pair cooperating jaws 21 whose grabbing and pulling actions are synchronized with the movement of the pusher lever 12. The jaws consist of two mandibles 22, 23 mounted in a scissor configuration. The working end of each mandible consists of a barbed cylinder 24, 25 akin to a cylindrical rasp, and whose outer surface has a high friction coefficient.

The jaws are biased toward a closing position where the cylinders are brought close together in a grabbing movement across the proximal extremity of the bone by a spring 26. The cylinders are rotated in opposite directions to pull the bone, or bones that have passed through the blade 13 away from the blade support plate 15. The pulling action of the cylinders also breaks any cartilage tying the distal end of the bone to the meat cut. The grabbing and pulling actions of the cylinders are interrupted when the mandibles are pushed apart from each other by a rotating cam or eccentric wheel 27 positioned therebetween. The rotating cam is mounted on a camshaft 28 driven by the main motor 3 through a right-angle driving box 29.

The meat cut holding station 2 and the meat cutting and bone extracting station 7 are both located in front of the front panel 30 of the apparatus enclosure. The meat cutting and bone extracting station is protected by a transparent shield 31 against inadvertent contact by the user of the machine. These two stations are the only component parts of the machine which are in contact with meat and need to be thoroughly cleaned after use cleaning can conveniently be done by removing the shield to get access to the entire meat cutting and bone extracting mechanisms. A flexible and pliable boot or sleeve 32 cinched at one end against the lever 12 and at its opposite end around the slot 33 in the front panel through which the lever passes prevents blood and meat debris from inside the apparatus enclosure.

A second eccentric wheel or cam 34 is mounted on the cam shaft 28 inside the enclosure. The outer surface of that second cam bears against a first arm 35 of a T-shaped rocker 36. The central leg 37 of the rocker is rotatively anchored at its base to a pivot point 38. The second arm 39 of the rocker bears against an internal part of the meat holding station lever 12. A spring 40 resiliently biases the push lever 12 rotating around its pivot point 13 toward the meat cutting and bone extracting station 7. The second cam 27 works against the biasing of the spring 40 to move the push lever backward and return the meat cut holding station to its home, loading position.

The second electrical motor 4 is coupled through a second right angle drive box 41 to a gear box 42. The gear box has two output drive shafts 43, 44. The first output drive shaft 43 normally turns in a counter-clockwise direction, while the second drive shaft 44 located immediately below it turns in a clockwise direction. Each drive shaft is terminated by an axial socket 45, 46 having a polygonal cavity 47, 48. Each of the two cylinders 24, 25 at the working end of each mandible is mounted on the spline shaft having a polygonal cross-section end corresponding to the shape of the socket cavities 47, 48. The end of each spline shaft opposite the cylinder is loosely inserted into one of the drive shaft cavities 47, 48, and is thus allowed to rock within the cavity as the cylinders move up and down with the mandibles while maintaining rotational coupling with the drive shafts.

A knob 50 behind the seat 11 can be used to manually hold the seat assembly or assist the pushing mechanism.

The operation and control of the apparatus is extremely simple. After loading the meat cutter between the seat 11 of the meat cut holding station 2 and the circular blade 14, while the seat is in its home position most distal from the meat cutting and boning station 7, the operator pushes a start button 51, or actuates a foot switch (not shown) that starts both motors 3, 4 running. The motors will keep running for a complete cycle, that is, until the meat cut holding station returns to its home position. The entire timing control and synchronization of the mechanisms are achieved through the two cams 27, 29 working on a single cam shaft 28. As the meat cut is translated toward the meat cutting and bone extracting stations, the jaws 21 are kept open with the bone grabbing cylinders 24, 25 turning idly. As the lever and the meat cut holding station reaches its maximum excursion, the jaws are closed over the proximal ends of the bone which has now passed through the blade and holding plate 15. The jaw remains closed with the cylinder turning a short time necessary to completely extract the bone from the meat cut. The jaws are then reopened while the meat cut holding station returns to its loading position. It should be noted that both meat processing functions, i.e. the pushing of the meat cut toward the blade, and the clenching of the jaws over the bone are performed under the pull of the lever spring 40 and jaws springs 26. The motor 3 and the cams 27, 29 are only used to return the lever 12 toward its home position, and to open the jaws 21. In the event that an operator gets an finger caught in the mechanism, he only needs to push against either one of those two springs to free the wayward finger, and not against the torque of the motors. An emergency stop button 52 is provided on the top panel of the apparatus to cut off power to the motor in case of need.

A two-position switch 53 on the front panel is used to invert the turning directions of the grabbing cylinders in case of jamming or for cleaning purpose. The maximum, backward excursion of the lever 12 is sensed by a contact switch 54 whose activation closes the bone extracting cycle. The entire cutting and bone-extraction station 7 can be readily dismantled for cleaning purpose by removing the two screws 55 securing the blade support plate 15, and the two screws 56 securing the pillar 57 supporting the jaw mechanism. Tension adjustment screw assemblies 58, 59 are provided for the lever spring 40 and jaw spring 26 respectively. The main electrical motor 3 has a power rating of $\frac{1}{15}$ horsepower. The cylinder driving motor 4 has a power rating of $\frac{1}{15}$ horsepower. The jaw spring 26 has a tension of about 18 kilograms. The lever spring has a tension of about 18 kilograms.

While the preferred embodiment of the invention has been described, modifications can be made and other embodiments may be devised without departing from the spirit of the invention and the scope of the appended claims.

What is claimed is:

1. An apparatus for extracting a bone from a cut of meat, said bone having a proximal extremity proximate a proximal end of said cut of meat, said apparatus comprising:

a translatable seat shaped and dimensioned to hold a distal end of said cut;

a frusto-conical blade axially facing said proximal end and extremity, said blade having an open base and an apical aperture dimensioned to be engaged by said proximal extremity of the bone but not by said proximal end of the cut; and a spring-driven pusher assembly for translating said seat toward said blade;

a retaining plate laying in a plane perpendicular to said axial direction, said plate supporting the base of said blade and having an opening coaxial therewith;

a pair of bone-grabbing jaws located on a side of said plate opposite said seat;

said jaws including a pair of cooperating mandibles, and a driving mechanism for moving said mandibles in alternate closing and opening movements each in relation to the other;

a cylinder having a high friction outer lateral surface rotatively held by each of said mandibles;

said mandibles and cylinders being positioned and dimensioned to clench said proximal extremity of the bone when said bone passes through said blade and opening;

means for rotating said cylinder along axes orthogonal to said axial direction and in opposite direction to each other in order to pull said bone away from said blade; and means for synchronizing the operation of said pusher assembly and of said driving mechanism wherein said means for synchronizing comprises:

a motor;

a camshaft rotatively driven by said motor;

a first cam mounted on said camshaft between said mandibles, said first cam being shaped to intermittently push said mandibles in opposite directions;

means for resiliently biasing said mandibles toward each other against said cam;

a second cam rotatably mounted on said camshaft; and means for linking said second cam to said pusher assembly;

whereby said bone moving in an axial direction passes through said apical aperture while said cut is partially spread open around said bone and retained by said blade.

2. The apparatus of claim 1, wherein said pusher assembly comprises:

a lever having a first end rotatably connected to a pivot point, and a second end linked to said seat;

means for resiliently biasing said second end and seat in a said axial direction towards said blade.

3. The apparatus of claim 2, wherein said means for linking comprises:

a T-shaped rocker having a leg rotatively anchored to a pivot point, a first arm in contact with said second cam, and a second arm in contact with said lever;

whereby said second cam intermittently pushes said rocker and lever in a direction opposite said biasing of the lever second end.

4. The apparatus of claim 3, wherein said means for rotating said cylinders comprise:

a gearbox having two output drive shafts; and means for rockingly and rotatively linking said cylinders to said shafts.

5. The apparatus of claim 4, wherein said means for linking comprises:

each of said drive shafts having a polygonal socket;

a spline shaft mounting each one of said cylinders, said spline shaft having a polygonal end loosely mounted into one of said sockets;

whereby said polygonal ends are allowed to rock within said sockets when said cylinder follows said opening and closing movements of said mandibles while maintaining rotative coupling with said driving shafts.

6. The apparatus of claim 2 wherein said means for resiliently biasing comprises springs;

whereby the translating of said seat and the closing movements of said mandible are driven by resilient pulls of said springs.

7. An apparatus for extracting a bone from a cut of meat which comprises:

a camshaft having mounted thereupon a plurality of cams;

a circular blade having a central opening;

means driven by a first of said cams, for axially translating said cut and bone toward said blade, and said bone through said opening;

means driven by a second of said cams, for grabbing and pulling a leading extremity of said bone passed through said opening; and said first and second cams being shaped, positioned, and dimensioned to synchronously control operation of said means for translating and means for grabbing and pulling.

* * * * *